United States Patent [19]
Aschoff et al.

[11] Patent Number: 5,499,354
[45] Date of Patent: Mar. 12, 1996

[54] METHOD AND MEANS FOR DYNAMIC CACHE MANAGEMENT BY VARIABLE SPACE AND TIME BINDING AND REBINDING OF CACHE EXTENTS TO DASD CYLINDERS

[75] Inventors: John G. Aschoff, Watsonville, Calif.; Jeffrey A. Berger, San Jose, Calif.; David A. Burton, Tucson, Ariz.; Bruce McNutt, Gilroy; Stanley C. Kurtz, Watsonville, both of Calif.

[73] Assignee: International Business Machines Corporation, Armonk, N.Y.

[21] Appl. No.: 64,295

[22] Filed: May 19, 1993

[51] Int. Cl.$^6$ .................................................. G06F 12/02
[52] U.S. Cl. ........................ 395/456; 395/440; 395/463; 364/DIG. 1; 364/243.41; 364/246.12
[58] Field of Search ........................... 364/200 MS File, 364/900 MS File; 395/400, 425, 439, 445, 440, 456, 463, 403

[56] References Cited

U.S. PATENT DOCUMENTS

| | | | |
|---|---|---|---|
| 4,399,503 | 8/1983 | Hawley | 395/425 |
| 4,463,424 | 7/1984 | Mattson et al. | 395/425 |
| 4,499,539 | 2/1985 | Vosacek | 395/425 |
| 4,503,501 | 3/1985 | Coulson et al. | 395/425 |
| 4,920,478 | 4/1990 | Furuya | 395/425 |
| 5,131,087 | 7/1992 | Warr | 395/425 |
| 5,325,499 | 6/1994 | Kummer et al. | 395/425 |

Primary Examiner—Eddie Chan
Assistant Examiner—Hiep Nguyen
Attorney, Agent, or Firm—R. Bruce Brodie; Paik Saber

[57] ABSTRACT

Dynamic allocation of read cache space is allocated among bands of DASD cylinders rather than to data sets or processes as a function of a weighted average hit ratio to the counterpart cache space. Upon the hit ratio falling below a predetermined threshold, the bands are disabled for a defined interval as measured by cache accesses and then rebound to cache space again.

6 Claims, 4 Drawing Sheets

DYNAMIC CACHE MANAGEMENT

DYNAMIX MANAGEMENT CACHE CONTROL FLOW obtaining cylinder band statistics

CYLINDER BAND HIT RATION CONTROL

METHOD AND MEANS FOR DYNAMIC CACHE MANAGEMENT BY VARIABLE SPACE AND TIME BINDING AND REBINDING OF CACHE EXTENTS TO DASD CYLINDERS

FIELD OF THE INVENTION

This invention relates to the storage of data in an external storage subsystem coupling a processor, and more particularly, to dynamically managing an LRU read data cache interposed in the data path between the external storage subsystem and the processor.

DESCRIPTION OF RELATED ART

Cylindrical Organization of DASD Storage

A DASD comprises one or more movably mounted disks coated with remanant magnetic material. Either fixed block or variable length records are recorded along circular track extents formatted on the disks. The tracks are concentric such that a movable arm with a read or write head or a switchable set of fixed heads must be positioned or activated over the desired track to effectuate transfer of the records to or from the disk. In an assembly of disks, the set of all tracks that can be accessed without repositioning the access mechanism is termed a "cylinder". Where a DASD stores 500 tracks per disk, there would be 500 cylinders. These cylinders may be grouped in logical or arbitrary sets. Contiguous cylinders are grouped together to form "bands" such that cylinders 0–10 might be a first band, 11–100 a second band etc. Efficient data movement frequently has required bulk transfer i.e. staging track's worth of data or even cylinder's worth of data at a time to another level of storage.

There is no necessary connection between the logical organization of data such as data sets and their counterpart cylinder and track location in DASD storage. For some purposes, such as reducing read data transfer time it is advantageous to store the data set records in contiguous tracks or cylinders. For other purposes, such as batch DASD recordation of random write updates of records, the writing might be to contiguous DASD storage but each record so written would be remote from other records in the same data set stored elsewhere in DASD.

Some Cache Basics

A cache is a special purpose high speed buffer interposed between a processor and a larger but slower speed memory or storage. If data is stored in the cache, then it can be accessed (termed a "hit") in a shorter amount of time by applications executing on the processor than if it were stored in the larger but slower memory. If data is not in the cache when referenced (termed a "miss"), then access must be made to the slower backing memory or storage.

The advantage of cache arises from the tendency of applications to make repeated references to the same data. This clustering of data is termed "locality of referencing". Performance measures include the ratio of the number of hits or misses to the total number of input/output (I/O) references. These are denominated the "hit ratio" or "miss ratio" respectively. Up through the 1970's, hit and miss ratios were only determined from reference traces, which limited their utility to static tuning of storage.

Caches and Replacement Discipline

Today, caches are everywhere. Processors employ separate data and instruction caches between the logical portion of the processor and main memory. Also, caches and related structures (non-volatile store) are interposed in the path to data residing in external storage subsystem of direct access storage devices (DASDs) and the like. Because caches are finite and expensive resources, they are shared among concurrent processes or executing applications.

As might be expected, a DASD cache quickly fills up. This poses the problem of determining which data elements in cache must be destaged or eliminated so as to ensure sufficient space for the most recent "miss" i.e. the most referenced data element not located in cache but to be added thereto.

The prior art is replete with methods for replacement such as "least recently used" (LRU) in which the data element to be destaged or eliminated is the one which has not been referenced over the longest period of time. Indeed, this is termed LRU ordering of cache contents.

Dynamic Management of LRU Disciplined Cache

Conventional dynamic management of LRU DASD cache inventions are exemplified by the Mattson and Berger references.

Mattson et al, U.S. Pat. No. 4,463,424, "Method for Dynamically Allocating LRU/MRU Managed Memory Among Concurrent Sequential Processes", issued Jul. 31, 1984, teaches the dynamic determination of hit ratios from I/O reference traces for a concurrently accessed demand paging virtual storage system. Mattson also teaches that such ratios can be used to form and maintain an LRU ordering of pages and for varying the numar of cache addresses assigned to each of several concurrent processes as a function of said ratio.

Berger et al, U.S. Ser. No. 07/908,698, "Data Set Level Cache Optimization", filed Jul. 2, 1992 discloses dynamically managing an LRU disciplined DASD cache staging data sets. Berger uses a threshold formed by the inverse of slowly varying global hit ratios (ST) taken over a large number of data sets. This threshold controls the access by individual data sets in cache as measured by their local hit ratios (DSHR). After an initial trial period, a data set is allowed access to the cache only where DSHR>ST. The method and means are self adjusting in that as I/O demand changes, ST also changes in phase such that an increase in aggregate demand for cache results in elimination of data sets whose DSHRs were marginally equal to the old ST and now less than the new ST. Utilization of a DASD Fast Write and non-volatile store (NVS)can be managed similarly if coordinated with the cache and maintenance of both a global WRITE threshold (WR), local data set write hit ratio (DSHRW), and invocation of Fast Write only where DSHRW>WT.

The Berger reference is predicated on the observation that a group of addressable logically related records, pages or files termed a "data set" is a cacheable unit of data likely to exhibit homogeneous locality of reference. A "data set" typically spans more than a DASD track at the low end and one or volumes at the high end.

Separation of Read and Write Caches

Separate physical read and write paths to and from externally stored data and a requesting host have long been maintained to increase throughput. Such separation is also found among caches. Typically, write caches will employ fault tolerance features such as a battery backed non-volatile store. Also, write caches may generate a write complete signal to an accessing CPU to reduce the CPU/write cache path binding timing. Furthermore, write caches may batch several writes prior to copying to DASD in order to reduce copy time. In contrast, read caches are always conveniently refreshed from the backing store with presumably the most recent update of the data page or record.

The value of read caching lies in a high hit ratio. For a cache full condition, each miss incurs the overhead of LRU destaging or more accurately overwriting a predetermined portion of the read cache with the accessed contents of the backing store. The overhead involves the time for accessing the DASD, LRU cache processing, and staging the data. Maintenance of a high hit ratio can mask this overhead. In the limit, storage subsystem performance can degrade beyond that of an uncached system as where applications executing on the host engage in only long sequential or random access patterns with no re-referencing.

SUMMARY OF THE INVENTION

It is an object of this invention to devise a method and means for optimizing the hit ratio of a read only data cache in the path between cyclic external storage and an accessing processor in the absence of any data set information.

It is another object of this invention that such optimized method and means be applicable to an LRU read data cache and where the hit ratio is taken over predetermined cache extents or addressable regions.

These and other objects are believed satisfied by a method and means for allocating read data cache space among bands of DASD cylinders rather than to data sets or processes. The band allocation to the cache space subsists as a function of a weighted average hit ratio to the counterpart cache space. Upon the hit ratio falling below a predetermined threshold, the bands are disabled for a defined interval as measured by cache accesses and then rebind to cache space again.

This is embodied in a system comprising a partitionable read only cache interposed in a data path between a processor and at least one direct access storage device (DASD), and logic means for storing records at cylindrically addressable DASD locations. The logic means are responsive to a chain of commands from the processor for staging records either from the DASD or from the cache to the processor.

The inventive steps or means allocate read cache partitions to counterpart bands of DASD cylinders; measure a running average hit ratio for each partition and measure intervals defined by cache accesses; and responsive to the hit ratio for any partition falling below a predetermined threshold, disable the caching of the counterpart band for a defined interval as measured by cache accesses and then rebind the disabled band to another cache partition.

The measurement of hit ratios/cylinder band identifies data sets that are not cache efficient and controls their participation with a finer resolution than heretofore.

DESCRIPTION OF THE PREFERRED EMBODIMENT

The CPU, Cache, and DASD Storage

Figure 1:
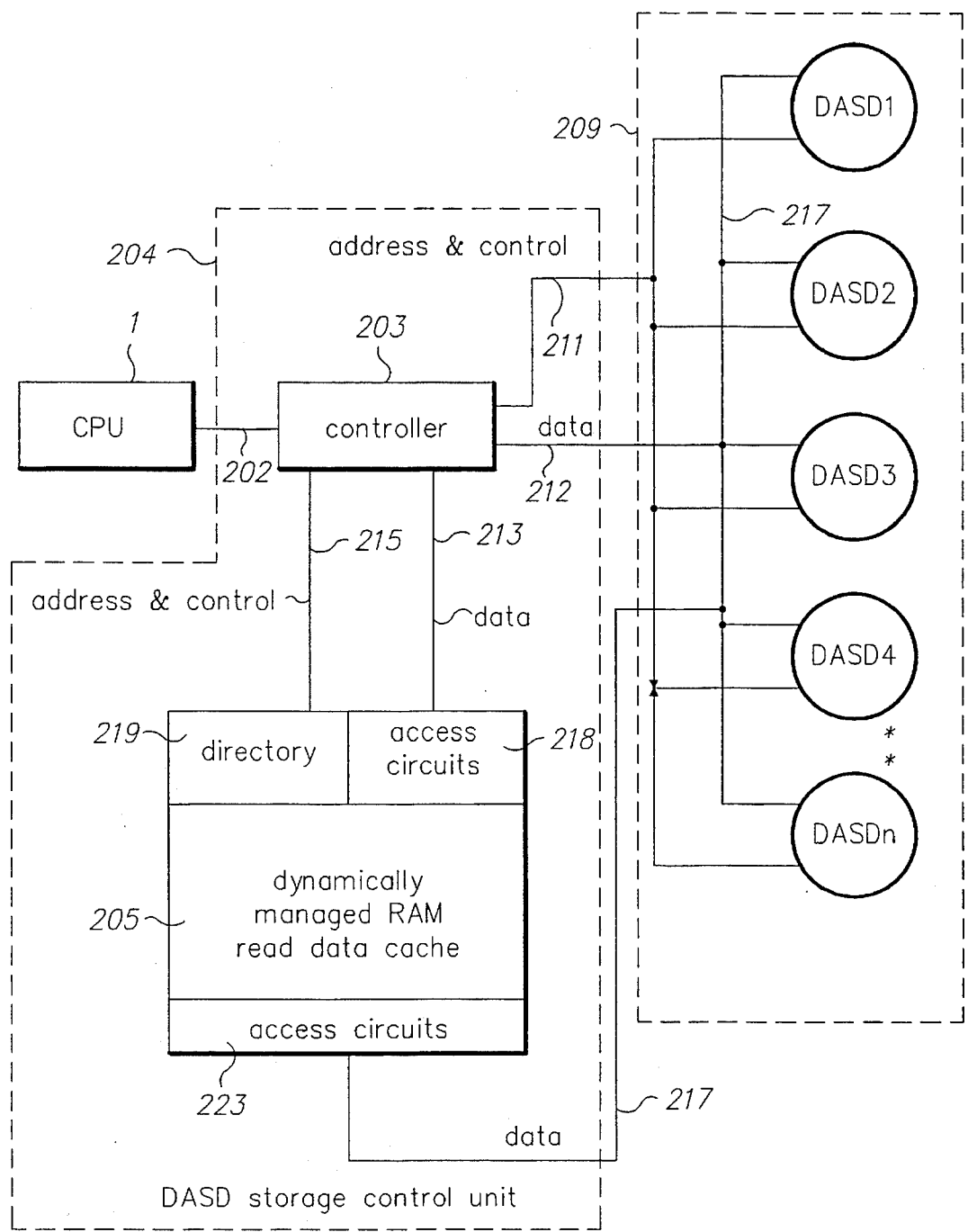
FIG. 1 shows a READ data cache interposed between a DASD storage and a host processor according to the invention.

Referring now to FIG. 1, there is shown a CPU 1 accessing a DASD storage control unit 204 over a path 202. Typically, such paths are demand/response or polling interfaces in which the host expresses access requests in a high level access or channel command language which is interpreted by a control unit (CU) 203. The CU accesses the directory of read data cache 205 over control path 215 and data path 213 to ascertain whether a dataset or portion thereof is cache resident. If the data set or portion thereof is not resident, then another data set or portion thereof may be destaged to the plurality of DASDs (DASD1, ..., DASDn) over control path 211 and data path 217 following the method and means of the invention.

Referring again to FIG. 1, dynamic cache management is implemented in the DASD storage control unit (SCU) 204 utilizing controller 203 and the read data cache 205. This eliminates the requirement for host system software support. That is, the SCU can adapt its caching behavior based on access characteristics.

CPU Accessing DASD, Role of CCW's, CKD and ECKD Architecture

CPU 1 may be of the IBM/360 or 370 architected CPU type having an IBM MVS operating system. An IBM/360 architected CPU is fully described in Amdahl et al, U.S. Pat. No. 3,400,371, "Data Processing System", issued on Sep. 3, 1968. Also, Luiz et al, U.S. Pat. No. 4,207,609, "Path Independent Device Reservation and Reconnection in a Multi-CPU and Shared Device Access System", issued Jun. 10, 1980 discloses CPU access to external storage under a variable length record architecture. This involves a virtual processor termed a "channel" on the CPU, chains of channel command words (CCW's) interpreted by a control unit in the path between the CPU and the DASD storage.

CPU 1's relationship to DASDs 209 (DASD1 ... DASDn) begins when the CPU 1 invokes the START I/O instruction. This instruction serves to establish a connection between the CPU and an addressed device and the execution of a channel program within the device. The invocation of the START I/O instruction causes control to be relinquished to a series of channel commands. This series or chain of channel commands (CCW's) is, in turn, sent over the channel to the control unit 204. The control unit 204 interprets each CCW (in controller 203) for selecting and accessing the DASDs 209 via controller 203, directory 219, access circuits 218, 223 and address & control paths 215 and 211. Such access effectuates any data movement across the interfaces as between DASDs 209 to control unit 204/read data cache 205 and path 217 and read data cache 205, data path 213, controller 203 to CPU i coupled on path 202.

As suggested, each channel program consists of a sequential list of operations resident in the CPU main memory. The transmission to and execution at the control unit of the CCW's takes place only after initial connection between the CPU and the control unit takes place. For each operation (CCW) in the channel program, one or more counterpart operations are required either at the control unit or device level over an active connection. Of course, the list or CCW sequence may be discontinuously executed (segmented). Certain of the CCW's such as SEEK and SET SECTOR permit the control unit to operate in disconnect mode from the CPU while a DASD access arm is positioned over the requested data. In contrast, a READ CCW requires a path connection between the storage subsystem and the CPU.

In order to reduce the amount of connect time between the CPU and the storage subsystem as applied for example to accessing variable length records (records of the form having fixed length count and key fields and variable length data fields), additional CCW's such as DEFINE EXTENT were created which would permit the storage subsystem to be responsive to read and write CCW's as long as they were within a defined region of storage without having to wait for a START I/O. Both the additional CCW's were termed "Extended Count, Key, Data" formatting or ECKD. Typical ECKD CCW chains include DEFINE EXTENT, LOCATE RECORD, SEEK, SET SECTOR, READ, READ . . . commands.

Read Cache Flow of Control

Figure 2:
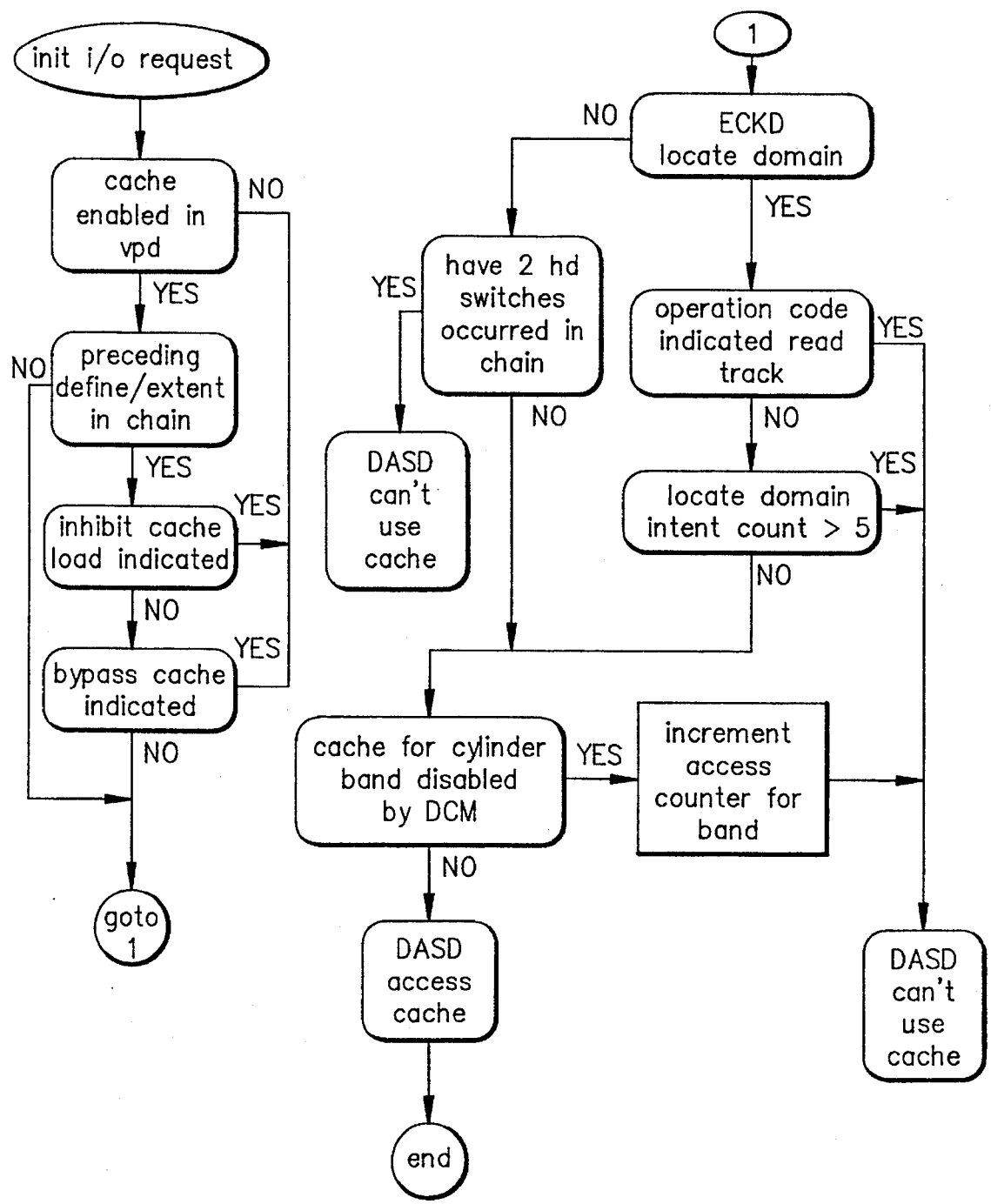
FIG. 2 depicts the overall cache flow of control for ECKD formatted variable length records.

Referring now to FIG. 2, there is depicted the overall cache flow of control for ECKD formatted variable length records. The control of caching occurs at several levels.

A first level of read cache management is at the DASD level. Each DASD is marked as cached or not cached in Vital Product Data (VPD). The VPD is a form of meta-data maintained and visible to the cache manager but transparent to all other control processes. DASDs that are marked as not cached will not use the caching algorithms and will not incur the associated overhead. This facilitates placing data sets on DASDs according to there caching characteristics. Data sets that are known to have poor cache usage access patterns may be placed on DASDs that do not attempt to use the cache methods and means of this invention. DASDs that are marked as "cached" utilize the dynamic caching method and means described below to determine whether or not data will be kept in the cache directory.

A second level of cache management is manifest by use of cache control bits in the Define Extent global attributes. This is a type of data storage management configuration control. If either Inhibit Cache Loading or Bypass Cache are indicated, the cache will be disabled for the entire CCW chain. If Sequential Access is indicated, the cache will be used in a special mode. At head switch points, a track DASD's tracks worth of data will be removed from the cache that is physically located two tracks prior to the current track (CC HH-2). This prevents sequential access chains from flooding the cache with data that is not likely to be accessed again prior to being invalidated by the normal LRU cache management.

A third level of cache management utilizes CCW chain analysis. The cache will not be used for ECKD chains that use the Read Track or Read Trackset operation codes. The cache will also be disabled for chains with Locate Record intent counts greater than some predetermined number say 5. For CKD chains, the cache will be disabled once two head switches are detected in the same chain. Once the cache has been disabled in a chain, it will remain disabled for the entire chain. Thus, if a chain contains two Locate Records and the first one has an intent count of 10, the cache will not be used for the second Locate irrespective of its content.

Obtaining DASD Cylinder Statistics

Figure 3:
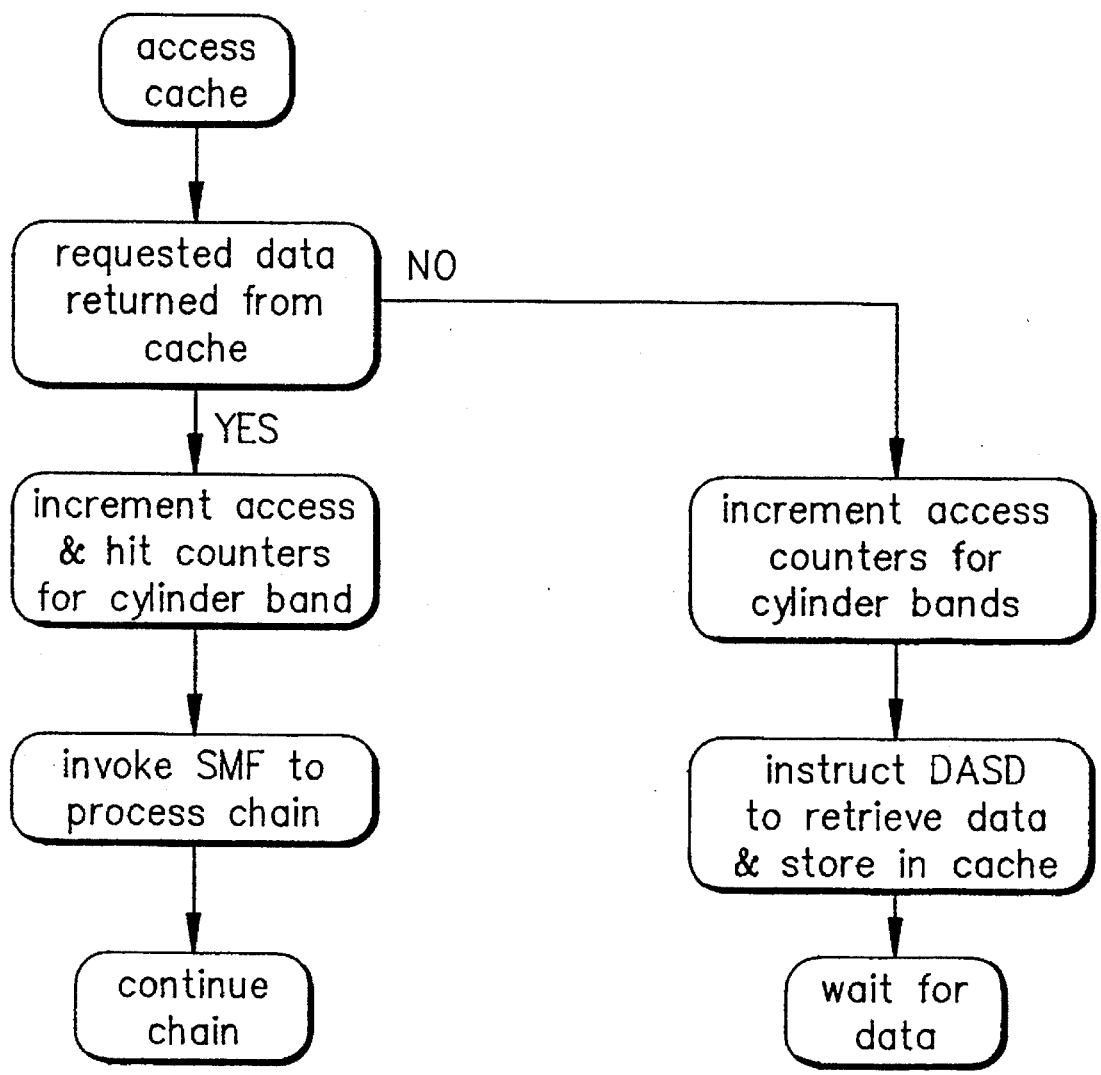
FIG. 3 sets out a flow of control for obtaining cache hit and miss statistics.

Referring now to FIG. 3, there is depicted a flow of control for obtaining cache hit and miss statistics. These statistics are used in connection with a fourth level of cache management. The fourth level is the level at which the invention is operative. That is, it relates to the dynamic adjustment of the DASD cylinder bands of cached DASDs that are actually using the cache. Statistics are kept for each device on a cylinder band basis in the form for example of a count each time a cache "hit" occurs. Each DASD is illustratively divided into 16 cylinder bands of 128 cylinders each. The outer most band, however, contains 236 cylinders. This division is used to optimize finding the appropriate counters to update for a given cylinder address.

It should be appreciated that controller 203 depicted in FIG. 1 comprises a processor, local memory, and a controller operating system. Such controller OS supports is a priority interrupt driven multi-tasking computer. Operatively, tasks are executed in background and foreground modes. A foreground task is usually one which must be executed in real time.

Referring again to FIG. 3, counters are associated with a given cylinder band of a DASD. They indicate the total number of accesses attempted for that cylinder band, the total number of cache hits for that band, a counter for the last 128 accesses to that cylinder band and the number of cache hits for the last 128 accesses. The two counters for the last 128 accesses and hits are maintained by foreground processes anytime the cache manager is referenced for a chain that is using the cache.

Cylinder Band Hit Ratio Control

Figure 4:
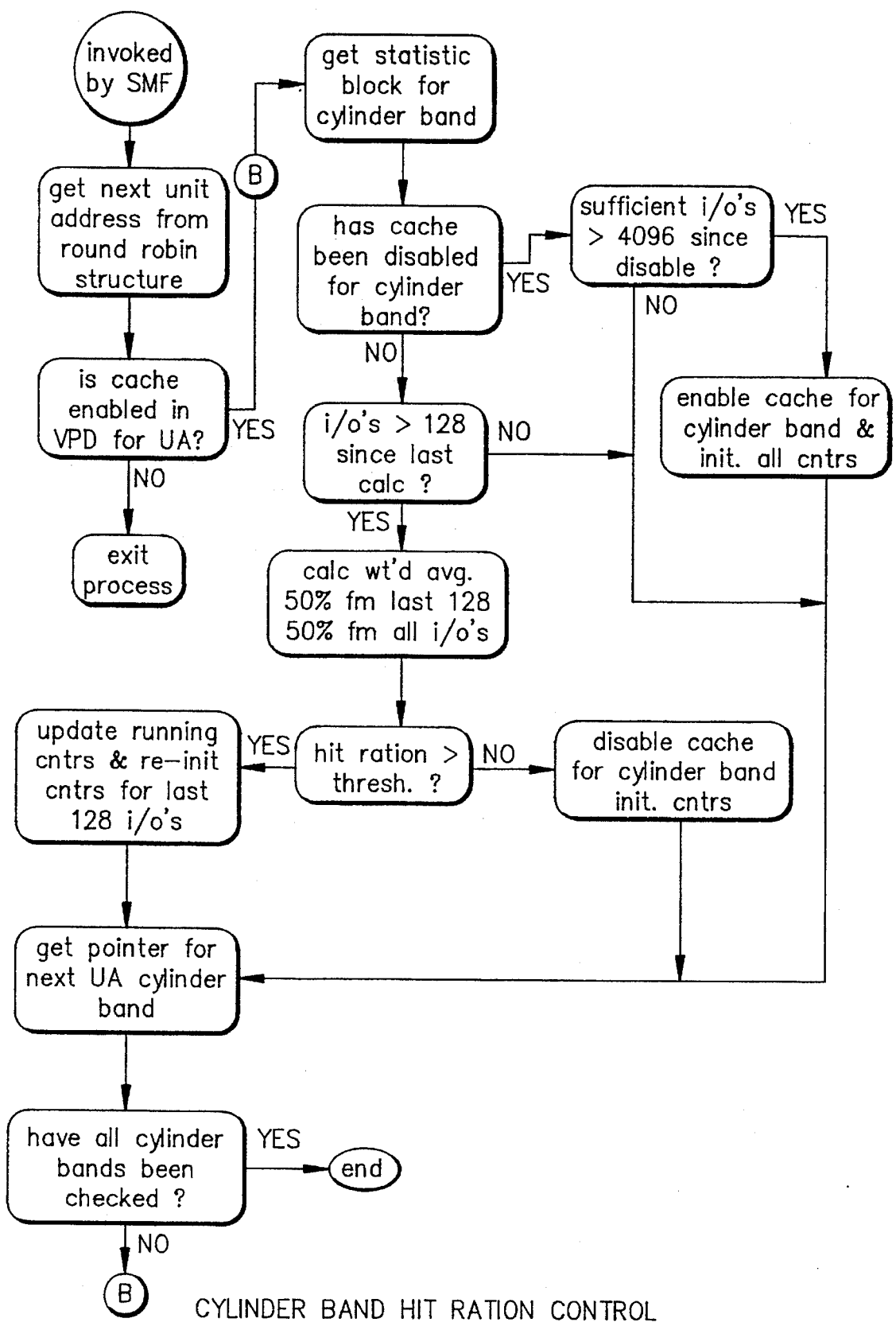
FIG. 4 illustrates the steps managing the timed disablement and re-enablement of cache elements counterpart to bands of cylinders falling below the hit ratio threshold.

Referring now to FIG. 4, there is illustrated the steps for managing the timed disablement and re-enablement of cache elements counterpart to bands of cylinders falling below the hit ratio threshold. A background process is used to update the counters which contain a history of accesses for all time for each cylinder band on a DASD. Every background loop, one UA is checked. Approximately every 128 I/Os, the counters for a cylinder band are updated. The hit ratio is estimated for the last 128 I/Os and for all time. Each of these hit ratios is used for a weighted average with each carrying equal weight. If the hit ratio for a particular cylinder band falls below a predetermined percentage say 30%, the cache is disabled for that cylinder band. The threshold of 30% or any other is an empirically determined quantity that may vary as a function of the variations in cache usage.

Once the cache has been disabled by the dynamic cache facility, all of the statistic counters for that cylinder range will be initialized to zero. The cache will remain disabled for the cylinder range until 4096 I/Os have occurred. After processing an additional 4K I/Os the cache will be enabled again. The statistics will again be gathered and the algorithm described above invoked to determine whether or not to continue caching the cylinder band. A table of the statistics is kept for each DASD supported in the subsystem.

The intent of analyzing hit ratios on a cylinder band basis is to identify particular data sets that are not utilizing the cache well. By controlling the caching behavior of a DASD on a cylinder band basis a finer grain of resolution is available to the subsystem to make adjustments to enhance the total system performance.

Example

The utility of this invention is in disabling caching when the performance of a DASD subsystem may be degraded due to unnecessary staging of additional records. There are two methods employed by this invention to accomplish the desired end affect. First, the CCW chain is analyzed to determine whether or not a particular access should be considered a good caching candidate. The logic for this is shown in FIG. 2. Secondly, if a CCW chain appears to be a good caching candidate, further analysis is performed on the historical reference patterns for the particular DASD address being accessed by the CCW chain to determine whether or not caching is warranted.

As an example, assume an application executing on CPU 1 is utilizing a particular DASD and has an index associated with that application located in the first cylinder band for that DASD. The remainder of the application data is spread across the remaining cylinder bands on the DASD. Assume that the DASD being used contains 160 cylinders so that each of the 16 cylinder bands consists of 10 cylinders or 150 tracks and that the cache for the subsystem can accommodate 10 cylinders or 150 tracks of data.

The application accesses the index once for every access it makes to one of the application data areas. This means that cylinder band 0 is referenced once each time any of the other cylinder bands are referenced. Assuming the access patterns for the application are random and evenly skewed across the DASD, once the cache fills to capacity, one half of the cache will contain data from cylinder band 0 since one half of all accesses are directed at this cylinder band. Each of the remaining 15 cylinder bands are accessed the remaining half of the time so the remaining cache space will be divided between these 15 cylinder bands or one thirtieth of the cache space will be used for each of these cylinder bands.

Given the characteristics above, the hit ratio for cylinder band 0 would be 75 tracks in cache/150 tracks in cylinder band=50%

The hit ratio for the remaining 15 cylinder bands would be 5 tracks in cache/150 tracks in cylinder band=3.3%

This results in an overall hit ratio for the subsystem of

50% * 0.5+3.3% * 0.5=26.6%

This hit ratio is below the 30% level that has been empirically determined to be the minimum hit ratio required to prevent performance degradation when using a cache for our DASD type. However, as each cylinder band gets accessed 128 times, the dynamic caching algorithm is invoked. The logic is invoked by a background process to analyze the hit ratio for each cylinder band. The first cylinder band to reach 128 accesses would be the band containing the indexes, or cylinder band 0.

The background process follows the following steps:

| | |
|---|---|
| Is the cache enabled in VPD for entire DASD? | Yes (otherwise no caching is performed). |
| The statistics for the DASD are accessed and the statistics for cylinder band 0 are read | |
| Check cache state flag | Caching is enabled for band, continue |
| Check last__128__access counter | >128 accesses have occurred, continue |
| Calculate weighted hit ratio average for cylinder band | only weight average if historical data is available |
| new__ratio = last 128 access hits/last 128 accesses if accumulated accesses = 0 then accum__ratio = accumulated hits/accumulated accesses | |

| | |
|---|---|
| weighted ratio = (new ratio + accum ratio)/2 else weighted ratio = new ratio | |
| Check weighted__ratio | >30% for cylinder band zero, continue |
| Updated the running counters accumulated__accesses += last 128 accesses accumulated__hits += last 128 access hits Get next cylinder band and repeat loop | keep historical data |

As the other cylinder bands are accessed 128 times, they will be processed in a similar manner by the background process. The important difference will be that the hit ratio for these cylinder bands will be much less than the required 30% for caching to remain enabled for the band. Caching will be disabled for all of the remaining cylinder bands for this DASD.

The application read referencing of the cache based DASD storage subsystem is now running to its optimum performance level. The entire index contained in cylinder band 0 is cached, and the remaining cylinder bands are accessing the DASDs for just the data required for the current request. The hit ratio for the index is 100%, all 150 index tracks fit in the cache.

To carry this example further, assume another application executes on CPU 1 that also utilizes the same DASD. The new application only utilizes data contained in the last cylinder band on the DASD and has good caching characteristics. At first, this applications data would not be cached because caching had been disabled for this cylinder band earlier due to the access patterns of the previous application.

However, as the applications run, the cylinder band will be enabled for caching again after every 4096 accesses. In this case, if the new application accesses the DASD with the same frequency that the original application accesses its index, the cache will be divided evenly between the two applications. When the background process rechecks the access statistics after 128 accesses to the cylinder band, the hit ratio for the last cylinder band will have improved to >30% and the caching will remain enabled for this cylinder band. The first cylinder band hit ratio will decrease due to the new activity but it will also remain above the required 30% and will continue to cache the index for the first application.

In this manner, this the method and means of this invention dynamically adapts the cache initialization in a subsystem to the workloads offered to the subsystem.

These and other extensions of the invention may be made without departing from the spirit and scope thereof as recited in the appended claims.

We claim:

1. In a system comprising a partitionable read data cache interposed in a data path between a processor and at least one direct access storage device (DASD), and means for storing records at cylindrically addressable DASD locations, a logic means responsive to a chain of commands from said processor for staging records either from the DASD or from the cache to the processor, said system further comprising:

(a) means for allocating read data cache partitions to counterpart space among bands of DASD cylinders;

(b) means for measuring a running average hit ratio for each cache partition and means for measuring intervals defined by a number of cache accesses; and (c) means responsive to the running average hit ratio for any partition falling below a predetermined threshold for disabling the caching of the counterpart band for a defined interval as measured by a number of cache accesses and for then rebinding the disabled band to another cache partition after a predetermined number of I/Os have occurred.

2. A method for dynamically managing a read data cache interposed in a data path between a processor and at least one direct access storage device (DASD), said processor communicating a chain of commands to a logic arrangement local to the read data cache and the DASD, said commands being interpreted by said logic arrangement for selectively staging records from the DASD to the processor through cache, for staging records in the read data cache to the processor, and for staging records from the DASD to the processor, each of the records residing at a discrete DASD cylindrical address, comprising the steps of:

(a) binding predetermined cache extents (range of cache addresses) to counterpart bands of DASD cylinders absent indicia of any logical association among records;

(b) measuring hit ratios as a running average of access activity for each cache extent; and (c) disabling access to the read data cache for a fixed time period for each band whose counterpart cache extent hit ratio running average falls below a predetermined percentage, and re-binding each disabled cylinder band to a cache extent subsequent to the fixed period and repeating steps (b) and (c).

3. The method according to claim 2, wherein said chain of commands includes commands selected from the set consisting of DEFINE EXTENT, LOCATE RECORD, SEEK, SET SECTOR, READ, and WRITE commands, and wherein said means for accessing records includes means for accessing variable length records in the extended count-key-data (ECKD) format, further comprising the step of:

(d) responsive to predetermined indicia coded into a chain having a DEFINE EXTENT, a READ TRACK, or a LOCATE RECORD command, disabling the DASD from use of the read data cache for the length of the chain in which the commands are embedded.

4. The method according to claim 2, wherein each DASD includes a plurality of read and write transducers positionable over DASD cylindrical addresses, said method further comprising the step of:

(e) ascertaining from the command chain whether said chain would require at least two head switches, a head switch occurring where said chain would require changing from one read head to another to read data, and disabling said DASD from use of the read data cache for the length of the command chain.

5. A method for dynamically managing a read data cache subject to a least recently used (LRU) discipline, said read data cache being interposed in a data path between a processor and at least one direct access storage device (DASD), said processor communicating a chain of commands to a logic arrangement local to the cache and the DASD, said commands being interpreted by said logic arrangement for selectively staging records from the DASD to the processor through cache, for staging records in the cache to the processor, and for staging records from the DASD to the processor, each of the records residing at a discrete DASD cylindrical address, comprising the steps of:

(a) binding predetermined cache partitions (range of cache addresses) to counterpart bands of DASD cylinders absent indicia of any logical association among records;

(b) measuring hit ratios as a running average of access activity for each read data cache partition including incrementing an access counter and a hit counter associated with each band, said running average being determined after a predetermined number of accesses; and (c) disabling access to the read data cache for a time period for each band whose counterpart cache partition hit ratio running average falls below a predetermined percentage, and re-binding each disabled cylinder band to a cache partition subsequent to the period and repeating steps (b) and (c), said time period being defined as the occurrence of a predetermined number of total cache accesses.

6. In a system comprising a partitionable read data cache interposed in a data path between a processor and at least one direct access storage device (DASD), and means for storing records at cylindrically addressable DASD locations, a logic means responsive to a chain of commands from said processor for staging records either from the DASD or from the read data cache to the processor, said system further comprising:

(a) means for binding read data cache partitions to counterpart bands of DASD cylinders absent indicia of any logical association among records;

(b) means for measuring hit ratios as a running average of access activity for each partition; and (c) means for disabling access to the read data cache for a fixed time period for each band whose counterpart cache partition extent hit ratio running average falls below a predetermined percentage, and re-binding each disabled cylinder band to a cache extent subsequent to the fixed period and repeating steps (b) and (c), access to records in said disabled band being staged directly from the DASD to the processor.

* * * * *